United States Patent
Ashley, Jr. et al.

(10) Patent No.: US 8,369,866 B2
(45) Date of Patent: Feb. 5, 2013

(54) METHOD AND SYSTEM FOR PROVIDING AREA SPECIFIC MESSAGING

(75) Inventors: James Ashley, Jr., Norco, CA (US); Patrick Mooney, Brea, CA (US)

(73) Assignee: Wirelesswerx International, Inc., Urbanizacion Marbella, PA (US)

( * ) Notice: Subject to any disclaimer, the term of this patent is extended or adjusted under 35 U.S.C. 154(b) by 997 days.

(21) Appl. No.: 12/044,840

(22) Filed: Mar. 7, 2008

(65) Prior Publication Data

US 2008/0220720 A1   Sep. 11, 2008

Related U.S. Application Data

(60) Provisional application No. 60/893,604, filed on Mar. 7, 2007, provisional application No. 60/955,855, filed on Aug. 14, 2007, provisional application No. 60/625,467, filed on Nov. 5, 2004.

(51) Int. Cl.
*H04W 24/00* (2009.01)

(52) U.S. Cl. ............... 455/456.1; 455/404.2; 340/10.51; 340/10.1; 340/539.11

(58) Field of Classification Search ............ 455/41.2, 455/41.1, 41.3, 456.1, 456.2, 456.3, 457, 455/404.2; 340/572.1, 426.19, 539.13, 539.32, 340/825.49, 10.1, 10.51, 10.31; 379/207.12
See application file for complete search history.

(56) References Cited

U.S. PATENT DOCUMENTS

| | | | |
|---|---|---|---|
| 3,518,674 A | 6/1970 | Moorhead et al. |
| 3,772,668 A | 11/1973 | Smith |
| 4,152,693 A | 5/1979 | Ashworth, Jr. |
| 4,217,588 A | 8/1980 | Freeny, Jr. |
| 4,217,668 A | 8/1980 | Sargent et al. |
| 4,224,596 A | 9/1980 | Knickel |
| 4,688,026 A | 8/1987 | Scribner et al. |
| 4,819,860 A | 4/1989 | Hargrove et al. |
| 4,847,773 A | 7/1989 | van Helsdingen et al. |
| 4,884,208 A | 11/1989 | Marinelli et al. |
| 4,958,645 A | 9/1990 | Cadell et al. |
| 5,142,281 A | 8/1992 | Park |
| 5,235,633 A | 8/1993 | Dennison et al. |
| 5,365,516 A | 11/1994 | Jandrell |
| 5,388,147 A | 2/1995 | Grimes |
| 5,389,934 A | 2/1995 | Kass |
| 5,479,482 A | 12/1995 | Grimes |

(Continued)

FOREIGN PATENT DOCUMENTS

| | | |
|---|---|---|
| CN | 1190183 A | 8/1997 |
| DE | 4028214 A1 | 3/1992 |

(Continued)

OTHER PUBLICATIONS

Carlos Colon, Jennifer Szaro and Jeff Curry, "Lakeland's Solar Hot Water Program", Relay Magazine, May-Jun. 2002, pp. 37-43, www.publicpower.com.

(Continued)

*Primary Examiner* — Nay A Maung
*Assistant Examiner* — Angelica Perez
(74) *Attorney, Agent, or Firm* — Greenberg Traurig LLP

(57) ABSTRACT

A system and method for precisely locating a mobile device at a precise geographical distance and messaging to communication devices carried by persons in specific areas is disclosed. The method utilizes at least two elements, a mobile device and at least one location tag. When activated, the mobile device will interact with all of the location tags in range and determine the location tag most practically near. The mobile device will then download detailed local information from the location tag most practically near. The messaging system may be used to selectively send messages to communication devices known to be within range of location transmitters or tags in a predetermined area.

35 Claims, 6 Drawing Sheets

U.S. PATENT DOCUMENTS

| | | | |
|---|---|---|---|
| 5,528,248 A | 6/1996 | Steiner et al. |
| 5,546,445 A | 8/1996 | Dennison et al. |
| 5,617,944 A | 4/1997 | McTaggart |
| 5,621,785 A | 4/1997 | Norimatsu |
| 5,627,517 A | 5/1997 | Theimer et al. |
| 5,642,303 A | 6/1997 | Small et al. |
| 5,670,944 A | 9/1997 | Myllymaki |
| 5,699,244 A | 12/1997 | Clark, Jr. et al. |
| 5,793,310 A | 8/1998 | Watanabe et al. |
| 5,796,634 A | 8/1998 | Craport et al. |
| 5,835,907 A | 11/1998 | Newman |
| 5,917,405 A | 6/1999 | Joao |
| 5,917,414 A | 6/1999 | Oppelt et al. |
| 5,917,415 A | 6/1999 | Atlas |
| 5,918,180 A | 6/1999 | Dimino |
| 5,938,721 A | 8/1999 | Dussell et al. |
| 5,946,611 A | 8/1999 | Dennison et al. |
| 5,986,508 A | 11/1999 | Nevin et al. |
| 6,002,994 A | 12/1999 | Lane et al. |
| 6,009,330 A | 12/1999 | Kennedy, III et al. |
| 6,014,089 A | 1/2000 | Tracy et al. |
| 6,043,748 A | 3/2000 | Touchton et al. |
| 6,055,426 A | 4/2000 | Beasley |
| 6,073,013 A | 6/2000 | Agre et al. |
| 6,102,856 A | 8/2000 | Groff et al. |
| 6,177,905 B1 | 1/2001 | Welch |
| 6,198,394 B1 | 3/2001 | Jacobsen et al. |
| 6,198,431 B1 | 3/2001 | Gibson |
| 6,198,914 B1 | 3/2001 | Saegusa |
| 6,236,358 B1 | 5/2001 | Durst et al. |
| 6,243,039 B1 | 6/2001 | Elliot |
| 6,265,978 B1 | 7/2001 | Atlas |
| 6,300,875 B1 | 10/2001 | Schafer |
| 6,317,605 B1 | 11/2001 | Sakuma |
| 6,324,404 B1 | 11/2001 | Dennison et al. |
| 6,330,446 B1 | 12/2001 | Mori |
| 6,360,164 B1 | 3/2002 | Murayama |
| 6,421,001 B1 | 7/2002 | Durst et al. |
| 6,438,382 B1 | 8/2002 | Boesch et al. |
| 6,446,004 B1 | 9/2002 | Cao et al. |
| 6,469,116 B2 | 10/2002 | Maccone et al. |
| 6,477,363 B1 | 11/2002 | Ayoub et al. |
| 6,496,116 B2 | 12/2002 | Farringdon et al. |
| 6,496,575 B1 | 12/2002 | Vasell et al. |
| 6,509,830 B1 | 1/2003 | Elliot et al. |
| 6,516,198 B1 | 2/2003 | Tendler |
| 6,531,924 B2 | 3/2003 | Aparin |
| 6,531,963 B1 | 3/2003 | Nyfelt |
| 6,574,484 B1 | 6/2003 | Carley |
| 6,577,897 B1 | 6/2003 | Shurubura et al. |
| 6,579,231 B1 | 6/2003 | Phipps |
| 6,597,365 B1 | 7/2003 | Baecke et al. |
| 6,599,243 B2 | 7/2003 | Wolterman et al. |
| 6,611,206 B2 | 8/2003 | Milanski et al. |
| 6,617,969 B2 | 9/2003 | Mi et al. |
| 6,625,457 B1 | 9/2003 | Raith |
| 6,646,873 B2 | 11/2003 | Chu-Chia et al. |
| 6,665,613 B2 | 12/2003 | Duvall |
| 6,674,368 B2 | 1/2004 | Hawkins et al. |
| 6,714,133 B2 | 3/2004 | Hum et al. |
| 6,717,513 B1 | 4/2004 | Shprecher et al. |
| 6,774,795 B2 | 8/2004 | Eshelman et al. |
| 6,801,974 B1 | 10/2004 | Watts, Jr. et al. |
| 6,812,824 B1 | 11/2004 | Goldinger et al. |
| 6,826,473 B1 | 11/2004 | Burch et al. |
| 6,839,027 B2 * | 1/2005 | Krumm et al. ............ 342/465 |
| 6,847,822 B1 | 1/2005 | Dennison et al. |
| 6,853,911 B1 | 2/2005 | Sakarya |
| 6,856,898 B1 | 2/2005 | Tompkins et al. |
| 6,859,653 B1 | 2/2005 | Ayoub et al. |
| 6,867,733 B2 | 3/2005 | Sandhu et al. |
| 6,868,074 B1 | 3/2005 | Hanson |
| 6,868,410 B2 | 3/2005 | Fortin et al. |
| 6,904,363 B2 | 6/2005 | Inbar et al. |
| 6,909,891 B2 | 6/2005 | Yamashita et al. |
| 6,922,565 B2 | 7/2005 | Rhodes et al. |
| 6,944,464 B2 | 9/2005 | Muranaga |
| 6,970,922 B1 | 11/2005 | Spector |
| 6,983,154 B2 | 1/2006 | Niwa |
| 7,013,151 B2 | 3/2006 | Hirokawa |
| 7,016,478 B2 | 3/2006 | Potorny et al. |
| 7,064,614 B2 | 6/2006 | Feng et al. |
| 7,138,916 B2 | 11/2006 | Schwartz |
| 7,174,301 B2 | 2/2007 | Florence et al. |
| 7,286,929 B2 | 10/2007 | Staton |
| 7,317,927 B2 | 1/2008 | Staton et al. |
| 7,323,982 B2 | 1/2008 | Staton |
| 7,426,197 B2 | 9/2008 | Schotten et al. |
| 7,539,742 B2 | 5/2009 | Spector |
| 7,848,765 B2 | 12/2010 | Phillips et al. |
| 7,870,229 B2 | 1/2011 | Spector |
| 8,285,245 B2 | 10/2012 | Ashley, Jr. et al. |
| 8,290,515 B2 | 10/2012 | Staton et al. |
| 8,315,203 B2 | 11/2012 | Ashley, Jr. et al. |
| 2001/0027378 A1 | 10/2001 | Tennison et al. |
| 2001/0032236 A1 | 10/2001 | Lin |
| 2001/0034659 A1 | 10/2001 | Kobayashi |
| 2001/0040513 A1 | 11/2001 | McDonald |
| 2001/0046884 A1 | 11/2001 | Yoshioka |
| 2001/0048755 A1 | 12/2001 | Wiens et al. |
| 2002/0028702 A1 | 3/2002 | Kim |
| 2002/0039903 A1 | 4/2002 | Niwa |
| 2002/0059434 A1 | 5/2002 | Karaoguz et al. |
| 2002/0068544 A1 | 6/2002 | Barzilay et al. |
| 2002/0072348 A1 | 6/2002 | Wheeler et al. |
| 2002/0072356 A1 | 6/2002 | Yamashita et al. |
| 2002/0111171 A1 | 8/2002 | Boesch et al. |
| 2002/0147006 A1 | 10/2002 | Coon et al. |
| 2002/0196151 A1 | 12/2002 | Troxler et al. |
| 2003/0013462 A1 | 1/2003 | Adachi |
| 2003/0137435 A1 | 7/2003 | Haddad et al. |
| 2003/0141962 A1 | 7/2003 | Barink |
| 2003/0149526 A1 | 8/2003 | Zhou et al. |
| 2003/0158635 A1 | 8/2003 | Pillar et al. |
| 2003/0163287 A1 | 8/2003 | Vock et al. |
| 2003/0186709 A1 | 10/2003 | Rhodes et al. |
| 2004/0024522 A1 | 2/2004 | Walker et al. |
| 2004/0036599 A1 | 2/2004 | Martin et al. |
| 2004/0043774 A1 | 3/2004 | Lee |
| 2004/0075553 A1 | 4/2004 | Ono |
| 2004/0082840 A1 | 4/2004 | Chen |
| 2004/0152460 A1 | 8/2004 | La et al. |
| 2004/0176106 A1 | 9/2004 | Tendler |
| 2004/0180668 A1 | 9/2004 | Owens et al. |
| 2004/0192271 A1 | 9/2004 | Eisner et al. |
| 2004/0196182 A1 | 10/2004 | Unnold |
| 2004/0201454 A1 | 10/2004 | Waterhouse et al. |
| 2004/0203944 A1 | 10/2004 | Huomo et al. |
| 2004/0207541 A1 | 10/2004 | Choi |
| 2004/0208344 A1 | 10/2004 | Liu et al. |
| 2004/0215750 A1 | 10/2004 | Stilp |
| 2004/0220731 A1 | 11/2004 | Tucker et al. |
| 2004/0225436 A1 | 11/2004 | Yoshihashi |
| 2004/0248586 A1 | 12/2004 | Patel et al. |
| 2004/0249497 A1 | 12/2004 | Saigh et al. |
| 2004/0249560 A1 | 12/2004 | Kim et al. |
| 2005/0026627 A1 | 2/2005 | Boling et al. |
| 2005/0048987 A1 * | 3/2005 | Glass .................... 455/456.1 |
| 2005/0068227 A1 | 3/2005 | Caspi et al. |
| 2005/0070315 A1 | 3/2005 | Rai et al. |
| 2005/0085257 A1 | 4/2005 | Laird et al. |
| 2005/0090978 A1 | 4/2005 | Bathory et al. |
| 2005/0151654 A1 | 7/2005 | Curwen |
| 2005/0159883 A1 | 7/2005 | Humphries et al. |
| 2005/0246094 A1 | 11/2005 | Moscatiello |
| 2005/0275549 A1 | 12/2005 | Barclay et al. |
| 2006/0003809 A1 | 1/2006 | Boling et al. |
| 2006/0009240 A1 * | 1/2006 | Katz .................... 455/456.1 |
| 2006/0015223 A1 | 1/2006 | LeBlanc et al. |
| 2006/0015233 A1 | 1/2006 | Olsen et al. |
| 2006/0109107 A1 | 5/2006 | Staton et al. |
| 2006/0234727 A1 | 10/2006 | Ashley, Jr. |
| 2007/0004378 A1 | 1/2007 | Muhonen et al. |
| 2007/0244633 A1 | 10/2007 | Phillips et al. |
| 2007/0276270 A1 | 11/2007 | Tran |
| 2008/0040384 A1 * | 2/2008 | Kuznetsov ................ 707/103 Y |
| 2008/0147442 A1 * | 6/2008 | Warner et al. ................ 705/3 |

| | | | | | |
|---|---|---|---|---|---|
| 2008/0157972 A1* | 7/2008 | Duron et al. ............... 340/572.1 | WO | WO01-35190 A | 5/2001 |
| 2009/0138353 A1* | 5/2009 | Mendelson ..................... 705/14 | WO | WO01-63318 A | 8/2001 |
| 2010/0109842 A1* | 5/2010 | Patel et al. ................... 340/10.1 | WO | WO03-042926 | 5/2003 |
| 2010/0293106 A1 | 11/2010 | Rhoads et al. | WO | WO03-049060 A | 6/2003 |
| | | | WO | WO03-079587 | 9/2003 |
| | | | WO | WO 2006/058112 A1 | 6/2006 |

FOREIGN PATENT DOCUMENTS

| | | |
|---|---|---|
| DE | 19960219 | 6/2001 |
| EP | 0915398 | 5/1999 |
| EP | 1050853 A1 | 11/2000 |
| EP | 1345148 A | 8/2003 |
| EP | 1345148 | 9/2003 |
| GB | 2322248 A | 8/1998 |
| GB | 2369966 | 6/2002 |
| JP | 2000299891 A | 10/2000 |
| JP | 2003304184 A | 10/2003 |
| MX | 299005 | 5/2012 |
| WO | WO00-01065 | 1/2000 |
| WO | WO00-41428 A | 6/2000 |
| WO | WO0041428 | 7/2000 |
| WO | WO02-063768 | 8/2000 |
| WO | WO01-46926 A | 1/2001 |

OTHER PUBLICATIONS

International Search Report from PCT/US08/56314.
Wirelesswerx TrakWERK II SMS/Satellite Dual Mode Tracking Unit, Manual, Nov. 17, 2003, pp. 1-20.
Wirelesswerx Training Outline, Manual, Oct. 29, 2004, pp. 1-44.
Wirelesswerx System Description Tucson01, Manual, Feb. 8, 2006, pp. 1-10.
Wirelesswerx Requirements Specification Tucson01, Manual, Feb. 27, 2006, pp. 1-35.
Wirelesswerx Technical Overview, Manual, Sep. 10, 2003, pp. 1-19.

* cited by examiner

METHOD AND SYSTEM FOR PROVIDING AREA SPECIFIC MESSAGING

CROSS REFERENCE TO RELATED APPLICATIONS

This application relates to U.S. utility patent application Ser. No. 11/848,178, filed Aug. 30, 2007 and claims the benefit of the prior filing date of U.S. provisional patent application No. 60/625,467, filed Nov. 5, 2004. This application also relates to U.S. utility patent application Ser. No. 11/105,931, filed Apr. 13, 2005. This application is also related to U.S. utility patent application Ser. No. 11/105,621, filed on Apr. 13, 2005, and U.S. utility patent application Ser. No. 11/105,932, filed on Apr. 13, 2005. This application also claims the benefit of priority of U.S. Provisional Patent Application No. 60/893,604, filed Mar. 7, 2007 and entitled "Method and System To Track Persons Utilizing Wireless Media," and U.S. Provisional Patent Application No. 60/955,855, filed Aug. 14, 2007, entitled "Method and System For Providing Area Specific Messaging." The contents of all these applications are hereby incorporated by reference in their entirety.

BACKGROUND

1. Field

This application relates generally to systems and methods for monitoring and messaging of wireless communication devices in a specific geographical location.

2. General Background

Previous systems have been developed to attempt and locate a wireless communication device utilizing wireless access points and routers. For example, the wireless communication device could be in a location having several buildings in range of the wireless communication device. However, these systems do not necessarily provide a precise location. In another situation, the wireless communication device may be in a building with several floors, each floor having it own location tag. In this situation, the wireless communication device may be closer to a location tag on a different floor.

SUMMARY

The present disclosure provides a solution for providing wireless communication devices with precise location awareness, system monitoring and area specific messaging capabilities in environments where an accurate GPS position may not be able to be acquired, such as within a multi-story building. The system monitoring component performs health checks and validity tests on location tags within an enabled environment, while the area messaging component provides area-specific messaging to enabled wireless communication devices. As used in this specification, "location tag" is a stationary programmable device with a wireless transceiver, "Bluetooth" capable for example, and a micro-controller. The location tag is preferably programmed with one or more of its own device or "friendly" name selection parameters, geographical position, max power settings, installation identifier, floor number and payload type.

A wireless communication device operable to detect a plurality of location tags is disclosed. A wireless communication device periodically interrogates its environment and determines which location tag is most practically near. The wireless communication device then connects to that location tag and requests that any additional data information relevant to the specific location associated with that location tag be sent back to the wireless communication device. The most practically near is one which is the closest accessible location, for example, a wireless communication device on the second floor of a multi-story building may be closest to a location tag located on the ceiling of the first floor, but is not easily accessible from the first floor.

DRAWINGS

The foregoing aspects and advantages of present disclosure will become more readily apparent and understood with reference to the following detailed description, when taken in conjunction with the accompanying drawings, wherein.

DETAILED DESCRIPTION

The present disclosure relates to a system and method for the monitoring of and messaging to wireless communication devices within a predefined space, wherein the wireless communication device can be any wireless communication device with receiving and transmitting capabilities such as a cell phone, PDA, lap top computer, desktop computer and pager. The system and method utilizes, in its simplest form, at least two elements: a wireless communication device and at least one location tag. When the system is activated, the wireless communication device will determine all of the location tags within range. The wireless communication device will then determine the location of the most practically near location tag. The wireless communication device can then request information specific to its location from this most practically near location tag.

It should be appreciated that for simplicity and clarity of illustration, elements shown in the Figures and discussed below have not necessarily been drawn to scale. For example, the dimensions of some of the elements are exaggerated relative to each other for clarity.

Figure 1:
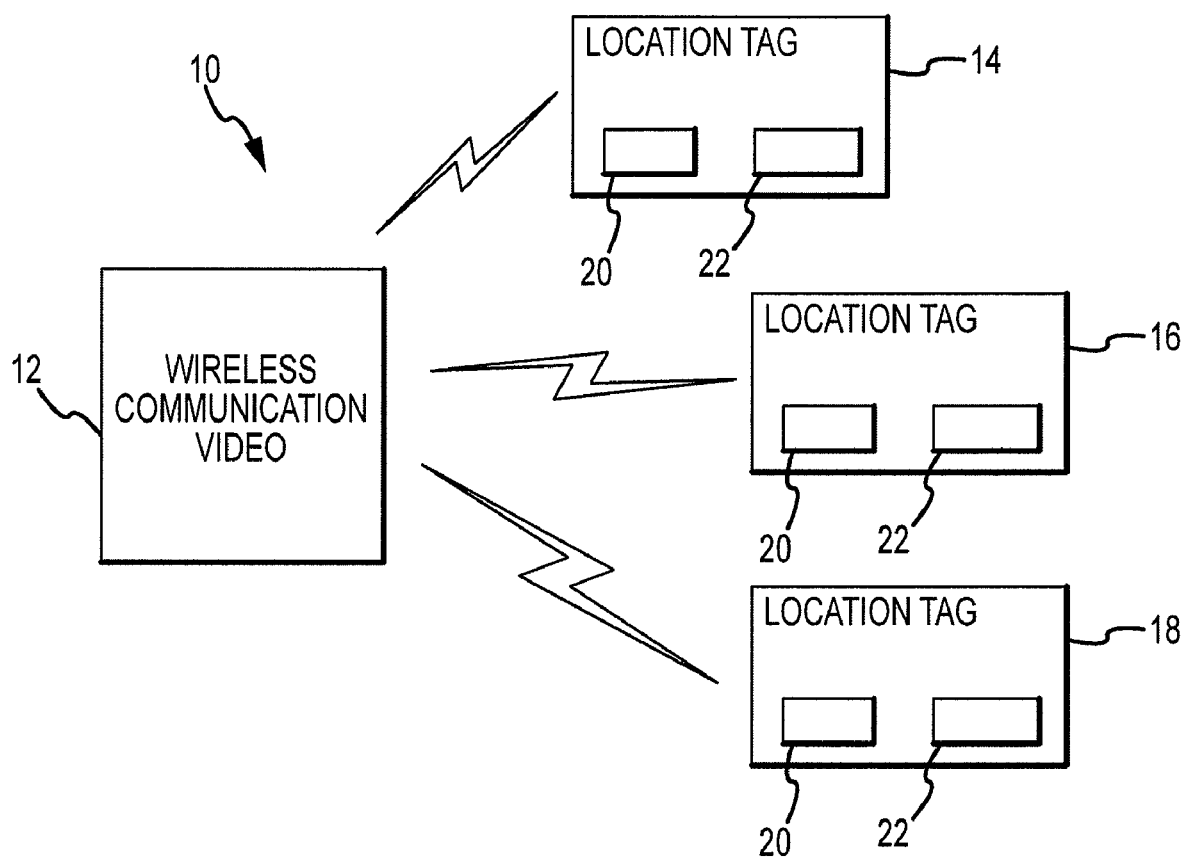
FIG. 1 illustrates an exemplary top-level system diagram in accordance with the present disclosure.

An exemplary embodiment of the location system 10 in FIG. 1 illustrates the main components of the system, the system comprising a wireless communication device 12 and a plurality of location transmitters or tags. There are a plurality of location tags 14, 16, 18 shown to illustrate that multiple location tags can be in range of the wireless communication device 10 at any specific time.

Each location tag 14, 16, 18 is a programmable transceiver communication device incorporating a radio transceiver module 20 and a micro-controller 22. In exemplary embodiments, the micro-controller 22 controls the radio module 20, responds to over the air queries from the wireless communication device 12, and stores and retrieves detailed location information in the form of data in the micro controller's non-volatile memory.

Each location tag radio module 20 will have its own location tag name, or friendly name. Selection parameters and the geographic position may be encoded and stored in the location tag name. In exemplary embodiments, the location tag name will include information including maximum power setting, installation identifier, floor number, payload type, tag latitude and longitude, and an integral checksum.

In another embodiment, the location tag name is limited to 16 characters and is encoded utilizing ASCII characters to efficiently and simply name the location tag.

Detailed location tag location information is found in the memory of each micro-controller of each location tag. In one example, the detailed location tag location information is formatted into a database according to Table 1.

TABLE 1

| Field | Data Type | Length |
|---|---|---|
| BT_NAME | CHAR | 6 |
| HOUSE_NO | CHAR | 10 |
| HOUSE_NO_SUFFIX | CHAR | 4 |
| PREFIX_DIRECTIONAL | ASCII | 2 |
| STREET_NAME | CHAR | 60 |
| STREET_SUFFIX | ASCII | 2 |
| POST_DIRECTIONAL | ASCII | 2 |
| POSTAL_COMMUNITY | CHAR | 32 |
| STATE | ASCII | 2 |
| ZIP_CODE | CHAR | 10 |
| BUILDING | CHAR | 40 |
| FLOOR | CHAR | 5 |
| UNIT_NO | CHAR | 5 |
| UNIT_TYPE | ASCII | 2 |
| LOCATION_DESCRIPTION | CHAR | 60 |

In exemplary embodiments, the detailed location information includes at least the address of the including the street number, street name, local community, state and zip code. The detailed location information may also include data including the name of the building, the floor number, the unit or room number, or type of room. In other embodiment, the detailed local information may include any relevant other information to provide specific or complementary information for quicker identification of the location.

In exemplary embodiments, the wireless communication device of the present disclosure is a Bluetooth enabled device. In other embodiments, the device may be a cell phone, a laptop computer, a pager, a personal digital assistant (PDA), or any other wireless communication device with the ability to receive the detailed wireless communication device location information from the location tag.

The wireless communication device 12 includes software components to interact with each of the radio modules 20 in the location tags 14, 16, 18. The wireless communication device 12 will periodically interrogate its environment and when it is in range of a location tag 14, 16, 18, the wireless communication device will connect to and query the location tag 14, 16, 18.

In the disclosed system and method, the wireless communication device 12 will receive selection parameter data from each location tag 14, 16, 18. Utilizing these selection parameters, the location tag will narrow the plurality of location tags 14, 16, 18 to the most practically near location tag 14, 16, 18. This is necessary because the closest location tag to a wireless communication device 12 on the second floor of a building could be on the ceiling of the first floor and thus be inaccessible from the second floor. In an exemplary embodiment an algorithm 50 located within the wireless communication device 12 is utilized to determine the location tag that is most practically near.

Figure 2A:
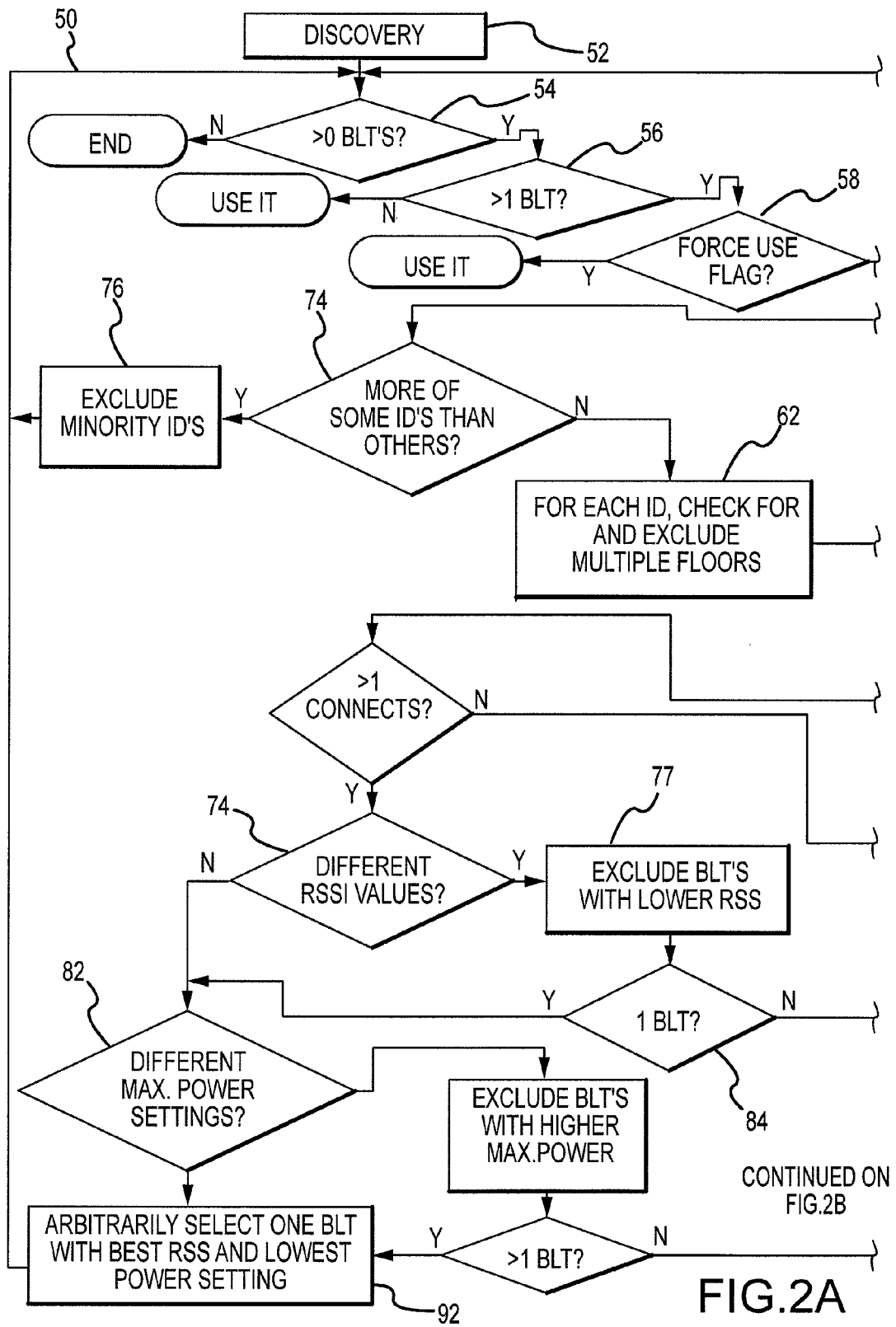
FIG. 2 illustrates a flow-chart of the algorithm utilized for detecting the precise location of the wireless communication device in accordance with the present disclosure.
Figure 2B:
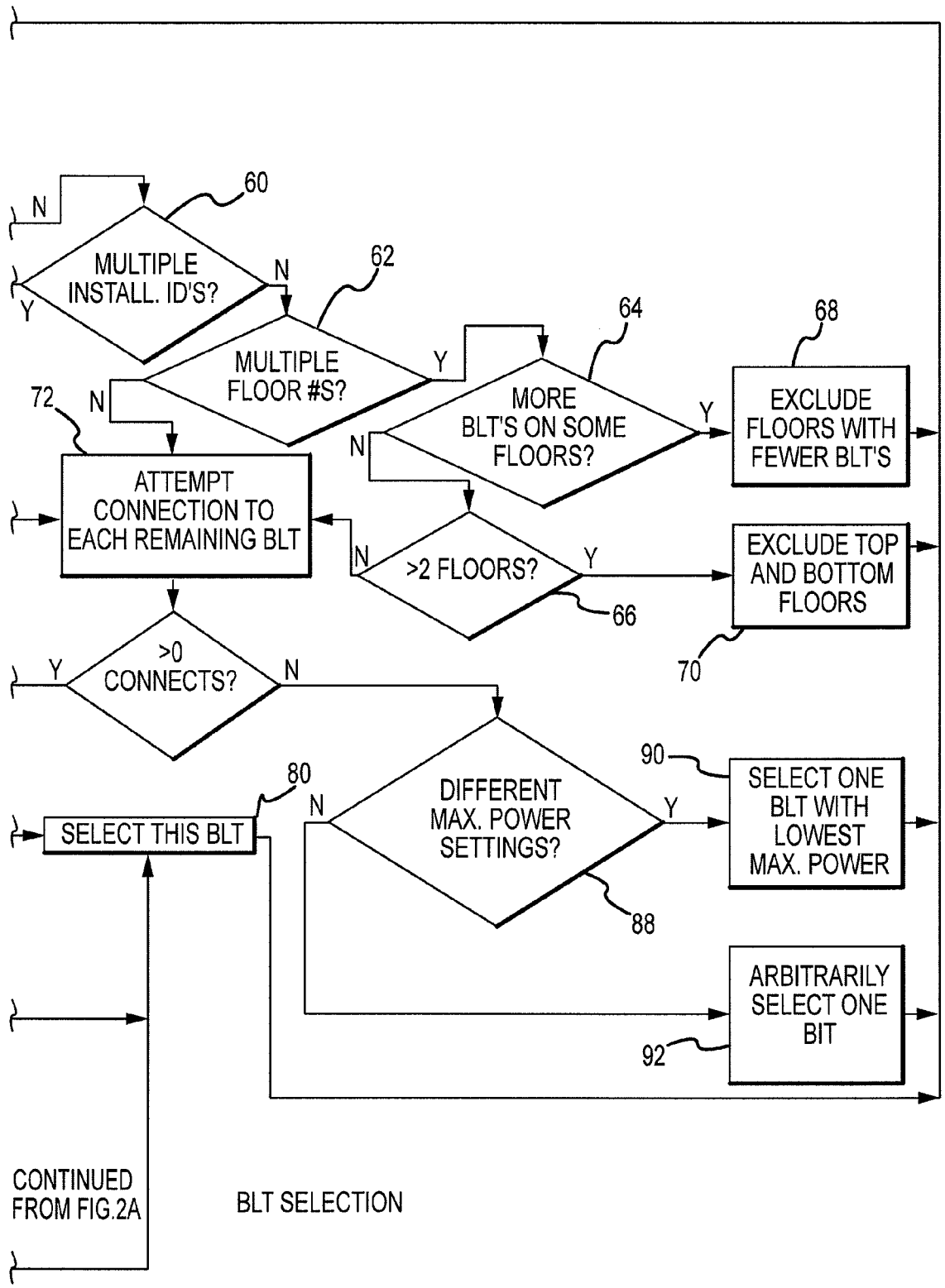

FIG. 2 illustrates an exemplary embodiment of the algorithm 50 utilized by the wireless communication device 12 to detect its location. The location tag selection algorithm 50 begins with a general wireless communication device discovery 52 of all location tag radios within range. The result of this wireless communication device discovery 52 is a list of location tag names, also known as friendly names, and the associated unique location tag radio addresses. Because valid location tag names have a special format and an integral checksum, radio wireless communication devices which are not location tags are easily excluded from this list.

For example, if a building only has a single location tag, and no other surrounding buildings maintain a location tag, this single location tag could be set using a force flag. This would allow for a quicker, more efficient selection and determination of the location of the location tag. Another example would be where several location tags are located within a small area within a building. These location tags could also be set using a force flag. This again would allow for a quick, efficient selection and determination of tag location.

After the wireless communication device discovery process 52 completes, if only one valid location tag has been discovered 56, this location tag is selected. If more than one valid location tag has been discovered then a series of steps begins to reduce this list down to one location tag that is the most practically near to the wireless communication device. If after any step, only one valid transmitter remains in the list the selection process ends with that location tag being selected.

As each location tag is discovered by the wireless communication device, the name is parsed to confirm if it is a valid location tag. At this time, if a location tag has a valid "force use" flag, this location tag is selected as the location tag that is most practically near. Use of the "force use" flag can reduce the selection process time down to one or two seconds but should only be used when it is certain that any wireless communication device within radio range must select that location tag with its force use flag set as true.

In another embodiment, the algorithm 50 may then utilize a step 60 to distinguish between different buildings or installations. When location tags are installed, all the location tags installed that are part of the same installation are assigned the same identifier.

For example, if two commercial buildings are in close proximity, and both have location tags installed, the installation identifiers will be different for each building. Therefore, if a wireless communication device in one building is within radio range of a location tag in the other building it can more easily select a location tag within its own building and installation area.

In exemplary embodiments, the installation identifier is not intended to provide a universally unique identification number but should provide a unique identifier for every installation within radio range of any other installation having location tags.

First, the wireless communication device determines how many installation identifiers are in range of the wireless communication device 60. The wireless communication device will detect more location tags in the building where it is located. If there are unequal numbers of location tags within the different installations 74, then the location tags in the building with fewer location tags are removed 76 from the list of possible location tags.

In another embodiment, the algorithm may utilize a step 62 distinguish between different floors of a building or installation. When location tags are installed, all the location tags installed that are on different floors of the same installation are assigned different floor identifiers in the location tag name.

In this step 62, the wireless communication device determines if more than one floor number is represented within one installation identifier. If there are unequal numbers of location tags on multiple floors 64, the wireless communication device eliminates those locations transmitters on the minority floors, i.e., on those floors which have the smaller number of location tags 68 sensed. If at this point, only one location tag is available, the wireless communication device chooses this location tag as the location tag that is most practically near.

In another embodiment where equal numbers of location tags exist on more than two different floors within one installation identifier, those location tags on the upper most and lower most floors are removed from the list 70. This step may be repeated until there are no more than two different floors within one installation identifier.

At this point, if more than one location tag remains in the list after the above steps then a serial port profile connection is attempted between the wireless communication device and each location tag remaining in the list 72. If the connection is successful then the location tag is queried for its received signal strength (RSS) for that connection 74.

RSS is queried from the location tag because the interface on the wireless communication devices does not generally support a query for an RSS value. If at least one connection and query for RSS is successful and the RSS value associated with that location tag is higher than the RSS value for all others 76, then that location tag is selected by the wireless communication device as the location tag that is most practically near to provide the detailed local information 80.

In the next step, if more than one location tag has an identically highest RSS value retrieved then the "maximum transmit power" settings are compared 82. If one location tag with highest RSS value has a maximum transmit power lower than the other(s) then this location tag is selected 84.

In another step, if all attempts at serial port profile connections and retrieval of RSS values have failed then the "maximum transmit power" settings encoded in the location tag names of the remaining location tags are compared by the wireless communication device 80. In exemplary embodiments, the first character of the wireless communication device name includes maximum power transit setting. If one maximum transmit power setting is lower than all others then this location tag is selected 90 since, all other factors being equal, a location tag with lower maximum transmit power will probably be most practically near to the wireless communication device.

In the next step of the algorithm 50, if, after all elimination steps are complete and more than one location tag remain in the list, then one of the remaining location tags is arbitrarily selected by the wireless communication device 92.

After the algorithm 50 has been run, when queried, the precise detailed local information from the selected location tag is returned to the wireless communication device.

Figure 3:
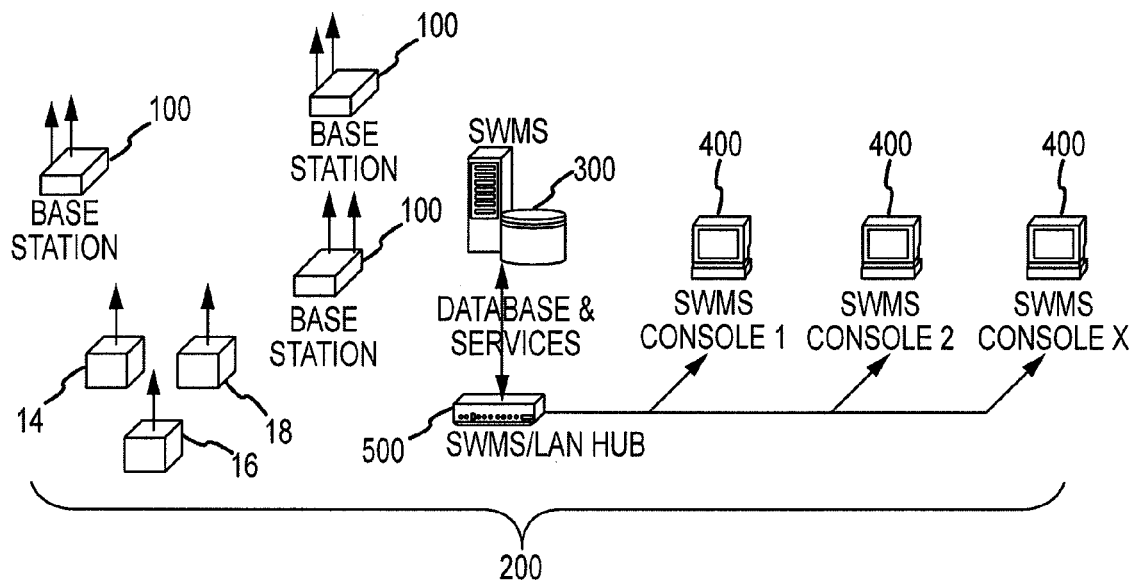
FIG. 3 illustrates an exemplary system in accordance with the present disclosure.

Another exemplary embodiment is shown in FIG. 3. Shown therein is a system including a management system 200 including a database 300, a(n) Console(s) 400, base stations 100, LAN hub 500 and location tags 14, 16, 18. Consoles 400 are utilized to administer the database 300 and configure the monitoring and messaging services.

Management base stations 100 are modules equipped with power circuitry, a micro-controller, and preferably a radio transceiver such as a Bluetooth radio and a Wi-Fi radio. The base stations 100 are self-contained in packaging and can either be connected directly into a constant power source or battery-powered.

The management system 200 interacts with an enabled location tag environment via management base stations 100 preferably over a wide-area network. The management system 200, for example, may communicate with the base stations 100 through their Wi-Fi radios, while the base stations 100 communicate with the location tags 14, 16, 18 though their Bluetooth radios. Only one base station 100 is required per enabled environment, but multiple base stations 100 can be used in sprawling areas or for load balancing.

Figure 4:
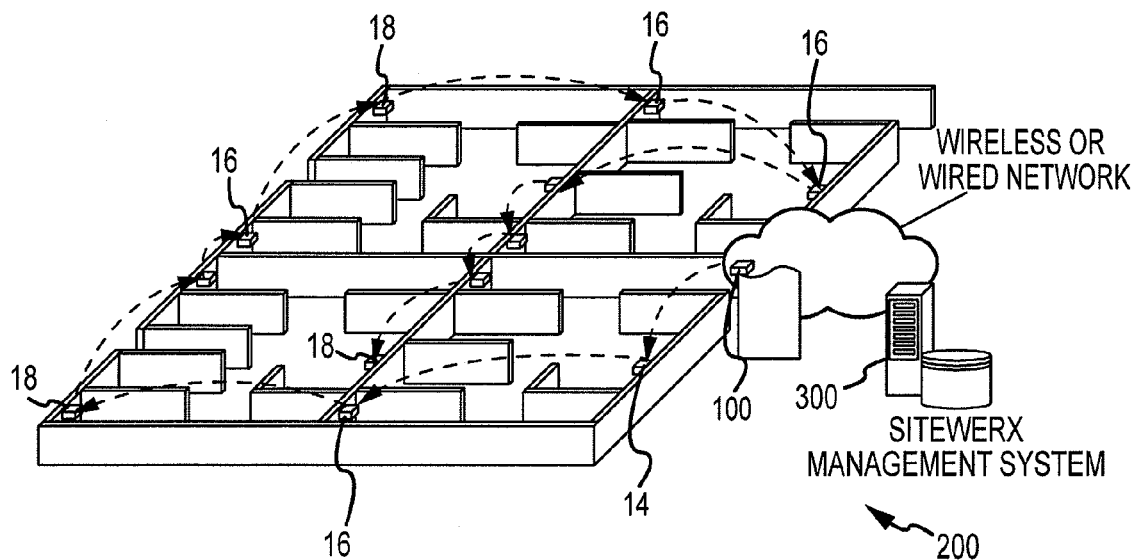
FIG. 4 illustrates an exemplary messaging application of the system in accordance with the present disclosure.

In FIG. 4, area specific messaging provides the ability to deliver messages to enabled wireless communication devices within a specific area, where the specific area could be defined by one location tag 14, 16, 18 to an entire enabled environment. The management system 200 initiates messaging via the management base station(s) 100, and preferably utilizes a "daisy chain" approach to pass pending messages to location tags 14, 16, 18 that may be installed at locations far beyond the range of any Bluetooth or Wi-Fi radio. Warnings are generated in the event a pending message cannot be delivered to a location tag 14, 16, 18 defining part of or all of the specific area.

Consoles 400 are used to configure area-specific messaging, utilizing a map displaying the placement and range of every location tag 14, 16, 18 within a messaging enabled environment. A message, its severity and its delivery path are then defined (or selected from a list of existing paths), beginning with a management base station 100, and linking a series of location tags 14, 16, 18. The message and its delivery path are then stored in the database 300, along with its delivery schedule.

Figure 5:
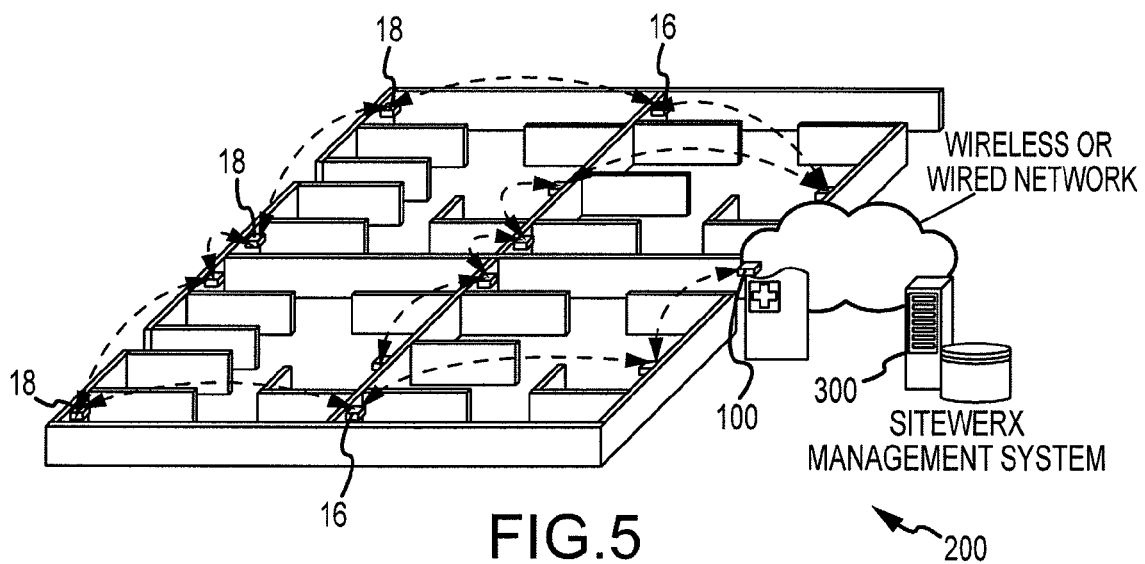
FIG. 5 illustrates an exemplary health check application of the system in accordance with the present disclosure.

A message may be sent via a console 400 to a base station 100. From base station 100, as shown in FIG. 5, the message is sent to the first location tag in a chain. Throughout the following discussion it is to be understood that the tags 14, 16 and 18 may be continuously connected or connected only on demand.

Figure 7:
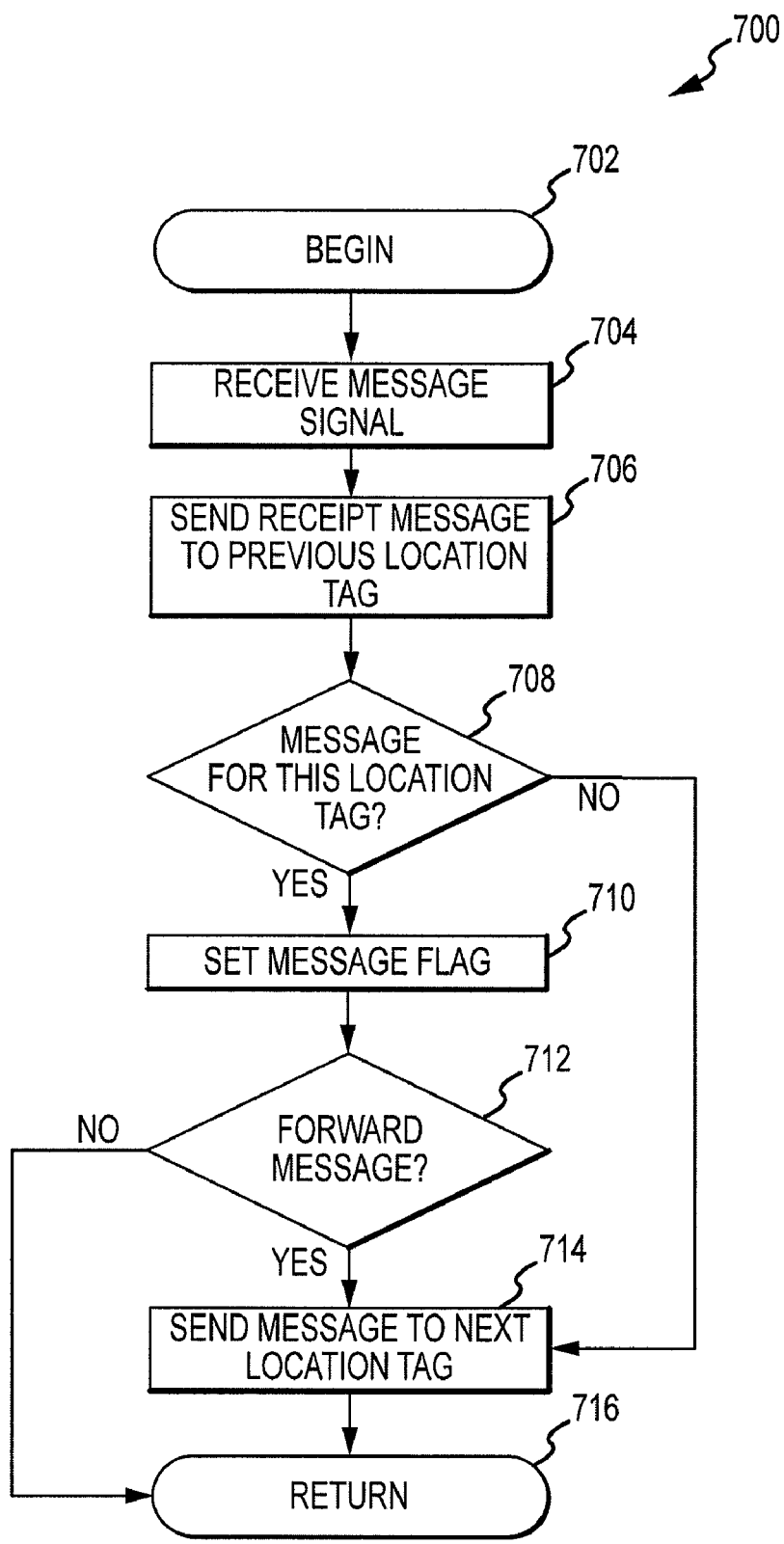
FIG. 7 illustrates an exemplary decision tree at the location tag in accordance with the present disclosure.

As illustrated in FIG. 4, this first tag is location tag 14. The location tag 14 will execute an algorithm 700 described below and shown in FIG. 7.

Location tag 14 will begin execution of algorithm 700 at operation 702 by coupling with a base station 100 if a message is to be sent to base station 100 for forwarding to communication devices that are within range of the location tags. Base station 100 sends the message signal to the first location tag 14. Control is then passed to operation 704 where the incoming message signal is received by location tag 14. Control is then passed to operation 706. Location tag 14 replies to the base station 100 with a receipt message acknowledging that the message was successfully received. Had location tag 14 been in the middle of the chain instead of the current example where it is the first location tag of the chain, location tag 14 would have sent a receipt message to the previous location tag in the chain.

Control is then passed to query operation 708. Query operation 708 asks whether the message is for that location tag. If it is, then a message flag is set so that the message is to be available in response to a query by wireless communication devices within its vicinity. If the message signal is not carrying the address for location tag 14, the answer is no and control is passed to operation 714. If the message signal is carrying the address of location tag 14, the answer is yes and operation is passed to operation 710.

At operation 710 a message flag is made available to wireless communication devices in the vicinity when they per-form their periodic inquiry or discovery of the location tags. When the message flag is made available, the wireless communication device can then retrieve the message from location tag 14.

Control is then passed to query operation 712. Query operation 712 determines if the message signal is carrying the addresses of other location tags farther down the chain and if it is, control is passed to operation 714. If the message signal is not carrying any other addresses, control is passed to the return operation 716.

At operation 714 the message is forwarded to the next location tag. In the current example that tag is location tag 16.

Control is now passed to 716 where the location tag 14 effectively "goes to sleep" and awaits further instructions from the base station 100 or to be queried again by a wireless communication device.

Area-specific messages may be initialized on a pre-defined schedule, or can be initialized immediately via a console 400. The initialization of an area-specific message begins at a management base station 100, and will leap from one location tag 14, 16, 18 to the next as defined in the daisy chain sequence. Location tags 14, 16, 18 will store the message in their flash memory if it is intended for them before passing that message on to the next location tag 14, 16, 18 in the sequence. The message initialization results are returned to the initiating management base station 100 in the reverse sequence of the daisy chain when the end of the daisy chain is reached. The management base station 100 transmits the results to the management system 200, which are then recorded in the database 300.

An exception report is returned to the initiating management base station 100 in the event an exception is encountered during the initialization of a message. The exception report is returned in the reverse sequence of the daisy chain beginning with the location tag 14, 16, 18 generating the exception. The management base station 100 transmits the exception to the management system 200, which generates the appropriate notifications and records the exception in the Database 300. The management system 200 will attempt to continue the initialization of the message utilizing alternate daisy chain path(s).

A message-pending flag is passed to enabled wireless communication devices as they interrogate, connect to and eventually select location tags 14, 16, 18 during the execution of the selection algorithm. If the selected location tag 14, 16, 18 is determined to have a message pending, and the severity level of that message falls within the criteria set on that wireless communication device, the message may be automatically downloaded and displayed on the wireless communication device. For example, "canned" messages may be transmitted and displayed automatically which could arise in emergency situations.

In another exemplary embodiment of operation of the system 200, which is shown in FIGS. 4 and 5, system monitoring may be used to verify that every location tag 14, 16, 18 within an enabled environment is running, has not been moved and its data has not been compromised. The management system 200 initiates system monitoring via the management base station(s) 100, and utilizes a "daisy chain" approach to communicate with the location tags 14, 16, 18 installed far beyond the range of any Bluetooth or Wi-Fi radio. Warnings can be generated and the daisy chain rerouted in the event an exception is encountered.

Consoles 400 are used to configure system monitoring, utilizing a map displaying the placement and range of every location tag 14, 16, 18 within an enabled environment. A health check daisy chain is then defined, beginning with a management base station 100, and linking a series of location tags 14, 16, 18. The specific series is then stored in the management system 200, along with its execution schedule. The management system 200 will ensure that all location tags 14, 16, 18 within an enabled environment are included in at least one health check series.

System monitoring will execute on a pre-defined schedule, or can be launched manually via a Console 400. The monitoring begins at a management base station 100, and will then leap from one location tag 14, 16, 18 to the next as defined in the daisy chain sequence. Each location tag 14, 16, 18 in the sequence verifies that the next location tag 14, 16, 18 in the sequence is running, has not been moved and its data has not been compromised. The monitoring results are returned to the initiating management base station 100 in the reverse sequence of the daisy chain when the end of the daisy chain is reached. The management base station 100 transmits the results to the database 300.

Figure 6:
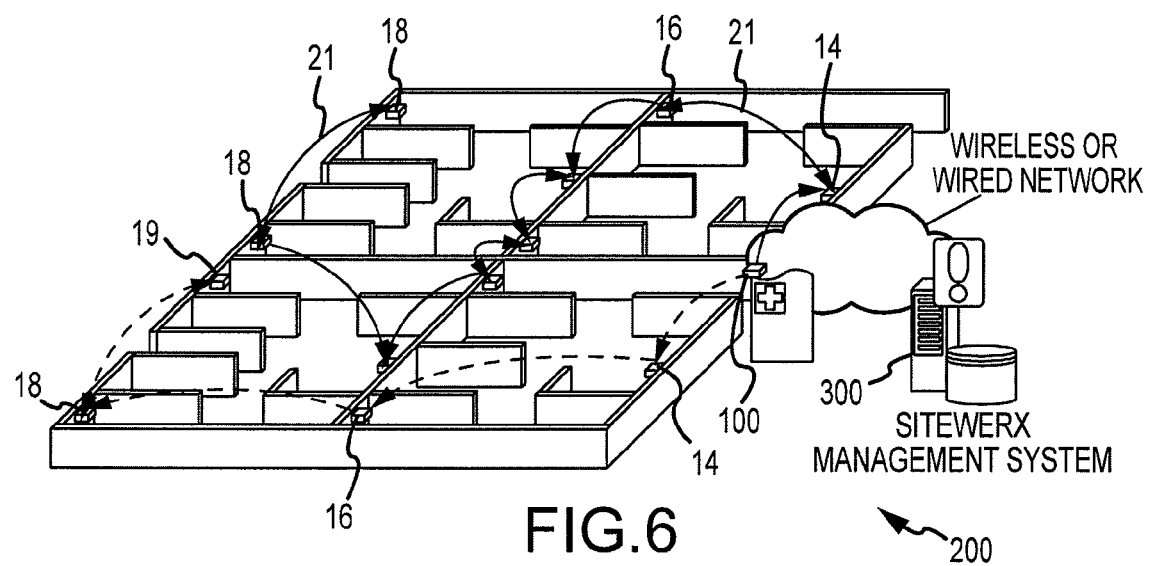
FIG. 6 illustrates an exemplary exception handling application of the system in accordance with the present disclosure.

Referring specifically to FIG. 6, an exception report is returned to the initiating management base station 100 in the event an exception, for example, at location tag 19, is encountered during system monitoring. The exception report is returned in the reverse sequence of the daisy chain beginning with the location tag 19 generating the exception. The management base station 100 transmits the exception to the management system 200, which generates the appropriate notifications and records the exception in the Database 300. The management system 200 will continue system monitoring utilizing an alternate daisy chain path 21, indicated by solid lines in FIG. 6, until the compromised location tag 19 is fixed, replaced or permanently removed from the system.

As a still further exemplary implementation of the disclosed system, a mobile client can send its location through the network shown in FIGS. 4 and 5. Here the system 200 may be utilized to collect communication device information, such as cell phone numbers, etc. In this case, any communication device may respond with a message such as "record that I'm here", or an equivalent signal, and thus the system may be used to track personnel locations. The system 200 may also be used to track mobile tags attached to moving entities in a similar manner, since the messages being transmitted may simply be acknowledgment signals that the mobile tag is within response range of a location tag 14, 16 or 18.

While the above description contains many particulars, these should not be considered limitations on the scope of the disclosure, but rather a demonstration of embodiments thereof. The system and methods disclosed herein include any combination of the different species or embodiments disclosed. Accordingly, it is not intended that the scope of the disclosure in any way be limited by the above description. The various elements of the claims and claims themselves may be combined in any combination, in accordance with the teachings of the present disclosure, which includes the claims.

The invention claimed is:

1. A method for a base station to determine the proximate location of a mobile device in a defined environment, the method comprising:
    providing a plurality of location tags set up in fixed stationary positions to define the defined environment, each location tag having a radio module and a microprocessor, the microprocessor storing detailed location information, and being a programmable transceiver;
    providing a base station outside of the defined environment for receiving from and sending messages to the plurality of location tags;

receiving a query from a mobile device in use to each location tag in range, the mobile device being for receiving and transmitting signals;

sending selection parameters from the multiple location tags to the mobile device;

the base station selecting a location tag most practically near to the mobile device from the plurality of location tags based on the selection parameters;

downloading, in response to a message from the base station, the detailed location information from the location tag most practically near to the mobile device, and thereby the base station detects through the fixed location tags the most practically near proximate location of the location tag relative to the mobile device, and the location of the mobile device; and selecting the location tag most practically near further comprises:
  determining floor identifiers in the plurality of location tags in range of the mobile device;
  determining a floor identifier represented by the highest number of location tags;
  selecting the plurality of location tags having the floor identifier represented by the highest number of location tags;
  wherein each individual floor of an installation has a floor identifier; and
  wherein if more than two floor identifiers are represented by the highest number of location tags, then any location tags located on the uppermost or lowermost floor of the installation are excluded.

2. The method of claim 1 wherein selecting the location tag most practically near comprises first determining from the plurality of location tags the number of location tags in range of the mobile device.

3. The method of claim 2 wherein if only a single location tag is in range, the single location tag is selected as the location tag most practically near.

4. The method of claim 1 wherein a location tag having a force use flag is automatically the location tag most practically near to the mobile device.

5. The method of claim 1 wherein selecting the location tag most practically near further comprises:
  determining installation identifiers in the plurality of location tags in range of the mobile device;
  determining a installation identifier represented by the highest number of location tags; and
  selecting the plurality of location tags having the installation identifier represented by the highest number of location tags.

6. The method of claim 1 further comprising if more than two floor identifiers remain represented by the highest number of location tags then repeating excluding any remaining uppermost and lowermost floor location tags.

7. The method of claim 1 wherein selecting the location tag most practically near further comprises:
  connecting the mobile device to each location tag through a serial port profile connection;
  determining received signal strength from the plurality of location tags in range of the mobile device;
  determining the highest received signal strength value; and
  selecting the plurality of location tags having the highest received signal strength.

8. The method of claim 7 wherein selecting the location tag most practically near further comprises:
  determining maximum power setting in the plurality of location tags having the highest received signal strength;
  determining the lowest maximum power setting; and
  selecting the plurality of location tags having the lowest maximum power setting.

9. The method of claim 8 wherein selecting the location tag most practically near further comprises arbitrarily selecting one location tag.

10. The method of claim 7 wherein selecting the location tag most practically near further comprises:
  determining maximum power setting in the plurality of location tags in range of the mobile device;
  determining the lowest maximum power setting; and
  selecting the plurality of location tags having the lowest maximum power setting.

11. The method of claim 10 wherein selecting the location tag most practically near further comprises arbitrarily selecting one location tag.

12. The method of claim 1 wherein selecting the location tag most practically near is accomplished when the plurality of location tags is narrowed to a single location tag based on the selection parameters.

13. The method according to claim 1 further comprising storing mobile device identification information for any mobile device selecting the location tag most practically near the mobile device.

14. The method of claim 1 wherein the base station is not one of the location tags nor a mobile device.

15. A method for a base station to determine the proximate location of a mobile device in a defined environment, the method comprising:
  providing a plurality of location tags set up in fixed stationary positions to define the environment, each location tag having a radio module and a microprocessor, the microprocessor storing detailed location information, and being a programmable transceiver;
  providing a base station for receiving from and sending messages to the plurality of location tags;
  receiving a query from a mobile device in use to each location tag in range, the mobile device being for receiving and transmitting signals;
  sending selection parameters from the multiple location tags to the mobile device;
  the base station selecting a location tag most practically near to the mobile device from the plurality of location tags based on the selection parameters;
  downloading the detailed location information from the location tag most practically near to the mobile device, and thereby detecting through the fixed location tags the most practically near proximate location of the location tag relative to the mobile device, and the location of the mobile device; and
  selecting the location tag most practically near further comprises:
    determining floor identifiers in the plurality of location tags in range of the mobile device;
    determining a floor identifier represented by the highest number of location tags;
    selecting the plurality of location tags having the floor identifier represented by the highest number of location tags;
    wherein each individual floor of an installation has a floor identifier; and
    wherein if more than two floor identifiers are represented by the highest number of location tags, then any location tags located on the uppermost or lowermost floor of the installation are excluded.

16. The method of claim 15 wherein the base station is not one of the location tags nor a mobile device.

17. The method of claim 15 wherein selecting the location tag most practically near further comprises:
   determining installation identifiers in the plurality of location tags in range of the mobile device;
   determining a installation identifier represented by the highest number of location tags; and
   selecting the plurality of location tags having the installation identifier represented by the highest number of location tags.

18. The method of claim 15 further comprising if more than two floor identifiers remain represented by the highest number of location tags then repeating excluding any remaining uppermost and lowermost floor location tags.

19. The method of claim 15 wherein selecting the location tag most practically near further comprises:
   connecting the mobile device to each location tag through a serial port profile connection;
   determining received signal strength from the plurality of location tags in range of the mobile device;
   determining the highest received signal strength value; and
   selecting the plurality of location tags having the highest received signal strength.

20. The method of claim 19 wherein selecting the location tag most practically near further comprises:
   determining maximum power setting in the plurality of location tags having the highest received signal strength;
   determining the lowest maximum power setting; and
   selecting the plurality of location tags having the lowest maximum power setting.

21. A method for a base station to determine the proximate location of a mobile device in a defined environment, the method comprising:
   providing a plurality of location tags set up in fixed stationary positions to define the environment, each location tag having a radio module and a microprocessor, the microprocessor storing detailed location information, and being a programmable transceiver;
   providing a base station for receiving from and sending messages to the plurality of location tags;
   receiving a query from a mobile device in use to each location tag in range, the mobile device being for receiving and transmitting signals;
   sending selection parameters from the multiple location tags to the mobile device;
   the base station selecting a location tag most practically near to the mobile device from the plurality of location tags based on the selection parameters;
   downloading the detailed location information from the location tag most practically near to the mobile device, and thereby having the base station detect through the fixed location tags the most practically near proximate location of the location tag relative to the mobile device, and the location of the mobile device; and
   selecting the location tag most practically near further comprises:
      determining floor identifiers in the plurality of location tags in range of the mobile device;
      determining a floor identifier represented by the highest number of location tags;
      selecting the plurality of location tags having the floor identifier represented by the highest number of location tags;
      wherein each individual floor of an installation has a floor identifier; and
      wherein if more than two floor identifiers are represented by the highest number of location tags, then any location tags located on the uppermost or lowermost floor of the installation are excluded.

22. The method of claim 21 wherein the base station is not one of the location tags nor a mobile device.

23. The method of claim 21 wherein selecting the location tag most practically near further comprises:
   determining installation identifiers in the plurality of location tags in range of the mobile device;
   determining a installation identifier represented by the highest number of location tags; and
   selecting the plurality of location tags having the installation identifier represented by the highest number of location tags.

24. The method of claim 21 further comprising if more than two floor identifiers remain represented by the highest number of location tags then repeating excluding any remaining uppermost and lowermost floor location tags.

25. The method of claim 21 wherein selecting the location tag most practically near further comprises:
   connecting the mobile device to each location tag through a serial port profile connection;
   determining received signal strength from the plurality of location tags in range of the mobile device;
   determining the highest received signal strength value; and
   selecting the plurality of location tags having the highest received signal strength.

26. The method of claim 25 wherein selecting the location tag most practically near further comprises:
   determining maximum power setting in the plurality of location tags having the highest received signal strength;
   determining the lowest maximum power setting; and
   selecting the plurality of location tags having the lowest maximum power setting.

27. A method for determining the proximate location of a mobile device in a defined environment, the method comprising:
   providing a plurality of location tags set up in fixed stationary positions to define the environment, each location tag having a radio module and a microprocessor, the microprocessor storing detailed location information, and being a programmable transceiver;
   receiving a query from a mobile device in use to each location tag in range, the mobile device being for receiving from and sending messages to the plurality of location tags;
   sending selection parameters from the multiple location tags to the mobile device;
   the mobile device selecting a location tag most practically near to the mobile device from the plurality of location tags based on the selection parameters;
   downloading the detailed location information from the location tag most practically near to the mobile device, and thereby having the mobile device detect the most practically near proximate location of the stationary location tag relative to the mobile device, and thereby the location of the mobile device; and
   selecting the location tag most practically near further comprises:
      determining floor identifiers in the plurality of location tags in range of the mobile device;
      determining a floor identifier represented by the highest number of location tags;
      selecting the plurality of location tags having the floor identifier represented by the highest number of location tags;
      wherein each individual floor of an installation has a floor identifier; and wherein if more than two floor identifiers are represented by the highest number of location tags, then any location tags located on the uppermost or lowermost floor of the installation are excluded.

28. The method of claim 27 wherein the mobile device is not one of the location tags.

29. The method of claim 27 wherein selecting the location tag most practically near further comprises:
   determining installation identifiers in the plurality of location tags in range of the mobile device;
   determining a installation identifier represented by the highest number of location tags; and
   selecting the plurality of location tags having the installation identifier represented by the highest number of location tags.

30. The method of claim 27 further comprising if more than two floor identifiers remain represented by the highest number of location tags then repeating excluding any remaining uppermost and lowermost floor location tags.

31. The method of claim 27 wherein selecting the location tag most practically near further comprises:
   connecting the mobile device to each location tag through a serial port profile connection;
   determining received signal strength from the plurality of location tags in range of the mobile device;
   determining the highest received signal strength value; and
   selecting the plurality of location tags having the highest received signal strength.

32. The method of claim 31 wherein selecting the location tag most practically near further comprises:
   determining maximum power setting in the plurality of location tags having the highest received signal strength;
   determining the lowest maximum power setting; and
   selecting the plurality of location tags having the lowest maximum power setting.

33. A method for determining the proximate location of a mobile device in a defined environment, the method comprising:
   providing a plurality of location tags, each location tag having a radio module and a microprocessor, the microprocessor storing detailed location information;
   providing a base station for receiving from and sending messages to the plurality of location tags;
   receiving a query from a mobile device in use to each location tag in range;
   sending selection parameters from the multiple location tags to the mobile device;
   the base station selecting a location tag most practically near to the mobile device from the plurality of location tags based on the selection parameters; and
   downloading, in response to a message, the detailed location information from the location tag most practically near to the mobile device, detecting the most practically near proximate location of the mobile device;
   selecting the location tag most practically near further comprises:
      determining floor identifiers in the plurality of location tags in range of the mobile device;
      determining a floor identifier represented by the highest number of location tags;
      selecting the plurality of location tags having the floor identifier represented by the highest number of location tags;
   wherein each individual floor of an installation has a floor identifier; and
   wherein if more than two floor identifiers are represented by the highest number of location tags, then any location tags located on the uppermost or lowermost floor of the installation are excluded.

34. A method for determining the proximate location of a mobile device in a defined environment, the method comprising:
   providing a plurality of location tags, the location tags being set up in fixed stationary positions to define the environment and each location tag having a radio module and a microprocessor, the microprocessor storing detailed location information, and being a programmable transceiver;
   providing a base station for receiving from and sending messages to the plurality of location tags;
   receiving a query from a mobile device in use to each location tag in range;
   sending selection parameters from the multiple location tags to the mobile device range, the mobile device being for receiving and transmitting signals with the location tags;
   the base station selecting a location tag most practically near to the mobile device from the plurality of location tags based on the selection parameters;
   downloading, in response to a message to the location tag, the detailed location information from the stationary location tag most practically near to the mobile device, and detecting the most practically near proximate location of the mobile device; and
   selecting the location tag most practically near further comprises:
      determining floor identifiers in the plurality of location tags in range of the mobile device;
      determining a floor identifier represented by the highest number of location tags;
      selecting the plurality of location tags having the floor identifier represented by the highest number of location tags;
   wherein each individual floor of an installation has a floor identifier; and
   wherein if more than two floor identifiers are represented by the highest number of location tags, then any location tags located on the uppermost or lowermost floor of the installation are excluded.

35. A method for determining the proximate location of a mobile device in a defined environment, the method comprising:
   providing a plurality of location tags, the location tags being set up in fixed stationary positions to define the environment and each location tag having a radio module and a microprocessor, the microprocessor storing detailed location information, and being a programmable transceiver;
   providing a base station for receiving from and sending messages to the plurality of location tags;
   receiving a query from a mobile device in use to each location tag in range;
   sending selection parameters from the multiple location tags to the mobile device range, the mobile device being for receiving and transmitting signals with the location tags;
   the base station selecting a location tag most practically near to the mobile device from the plurality of location tags based on the selection parameters;
   downloading, in response to a message to the location tag, the detailed location information from the stationary location tag most practically near to the mobile device, and detecting the most practically near proximate location of the mobile device; and selecting the location tag most practically near further comprises:

determining identifiers in the plurality of location tags in range of the mobile device;

determining an identifier represented by the highest number of location tags;

selecting the plurality of location tags having the identifier represented by the highest number of location tags; and wherein if more than two identifiers are represented by the highest number of location tags, then those location tags located on the installation are excluded.

* * * * *